(12) United States Patent
Zhang et al.

(10) Patent No.: US 9,403,707 B2
(45) Date of Patent: Aug. 2, 2016

(54) PENTAERYTHRITOL CORE, PHOSPHONIC ACID TERMINATED DENDRIMER AND ITS PREPARATION METHOD

(71) Applicant: Tongji University, Shanghai (CN)

(72) Inventors: Bingru Zhang, Shanghai (CN); Fengting Li, Shanghai (CN); Hongmei You, Shanghai (CN)

(73) Assignee: Tongji University, Shanghai (CN)

( * ) Notice: Subject to any disclaimer, the term of this patent is extended or adjusted under 35 U.S.C. 154(b) by 346 days.

(21) Appl. No.: 14/022,125

(22) Filed: Sep. 9, 2013

(65) Prior Publication Data

US 2014/0332471 A1    Nov. 13, 2014

(30) Foreign Application Priority Data

May 7, 2013    (CN) .......................... 2013 1 0165808

(51) Int. Cl.

| | |
|---|---|
| *C07C 69/34* | (2006.01) |
| *C07C 69/52* | (2006.01) |
| *C02F 5/14* | (2006.01) |
| *C02F 1/44* | (2006.01) |
| *C02F 103/02* | (2006.01) |
| *C02F 103/10* | (2006.01) |

(52) U.S. Cl.
CPC . *C02F 5/14* (2013.01); *C02F 1/441* (2013.01); *C02F 2103/023* (2013.01); *C02F 2103/10* (2013.01)

(58) Field of Classification Search
None
See application file for complete search history.

(56) References Cited

U.S. PATENT DOCUMENTS 6,399,742 B1 *  6/2002  Strukelj .................. C08F 14/16
427/384

* cited by examiner

*Primary Examiner* — Patrick Lewis

(57) ABSTRACT

A pentaerythritol core, phosphonic acid terminated dendrimer, its preparation method and application are provided. A preparation method of the pentaerythritol core, phosphonic acid terminated dendrimer (PETA-ADA-12PO$_3$H$_2$) comprises steps of processing Michael addition reaction on pentaerythritol tetraacrylate (C(CH$_2$OCOCH$_2$=CH$_2$)$_4$) and alkylidene diamine (NH$_2$CH$_2$(CH$_2$)$_n$NH$_2$), wherein n is an integer from 1 to 5, so as to obtain pentaerythritol core, amino group terminated dendrimer, and modifying the amino group by methylene phosphonic acid to obtain the PETA-ADA-12PO$_3$H$_2$ having a chemical formula of C[CH$_2$OCOCH$_2$CH$_2$N(CH$_2$PO$_3$H$_2$)CH$_2$(CH$_2$)$_n$N(CH$_2$PO$_3$H$_2$)$_2$]$_4$, wherein n is an integer from 1 to 5. The PETA-ADA-12PO$_3$H$_2$ has a high calcium tolerance, and excellent inhibiting efficiency of calcium carbonate, calcium sulfate and barium sulfate, which is applied in inhibiting the formation and deposition in the industrial water systems of circulating cooling water, oilfield flooding and reverse osmosis, and particularly suitable for water treatment with high calcium tolerance.

1 Claim, No Drawings

PENTAERYTHRITOL CORE, PHOSPHONIC ACID TERMINATED DENDRIMER AND ITS PREPARATION METHOD

BACKGROUND OF THE PRESENT INVENTION

1. Field of Invention

The present invention relates to the technical field of water treatment to inhibit the formation of scales. More particularly, the present invention relates to a pentaerythritol core, phosphonic acid terminated dendrimer and its preparation method, which is capable of inhibiting scales formation in industrial water systems, such as boiler, cooling, desalination, and oil production, especially in the industrial water treatment under the condition of high calcium concentration.

2. Description of Related Arts

Nowadays, water shortage and serious water pollution have become worldwide problems. Improving technical levels of industrial water treatment such as circulating cooling water, oilfield flooding and reverse osmosis has become an important measure for energy saving and emission reduction. Industrial water accounts for a proportion of over two thirds of city water consumption, and the circulating cooling water accounts for 70~85% of the industrial water. Therefore, increasing cycles of concentration of industrial circulating cooling water has become an effective measure for conservation and protection of water resources. However, with the increase of the cycles of concentration in the circulating cooling water and calcium concentration, advanced requirement is put forward to antiscalants used for the circulating cooling water treatment, i.e., antiscalants should not only be capable of inhibiting scales but also have high calcium tolerance simultaneously.

With the increasing scarcity of freshwater resources, reverse osmosis water treatment, which is simple, efficient and economical, is increasingly applied to fields such as desalination of seawater and brackish water, preparation of ultrapure water and wastewater treatment, and has become the first selected technology and technical support for promoting virtuous cycle of water resource utilization. However, with the increase of reverse osmosis recovery ratio, the calcium concentration on the reject side of the membrane is gradually increasing, and especially in seawater or brackish water, the calcium concentration is higher, which requires the antiscalants to have excellent inhibiting scale performance under high calcium concentration, i.e., the antiscalants should have higher calcium tolerance.

TABLE 1

| | Commercially available amino methylene phosphonates | | |
|---|---|---|---|
| Name (Abbreviation) | Applicating age | Structure and Molecular weight | |
| Amino trimethylene phosphonic acid (ATMP) | 1970s | 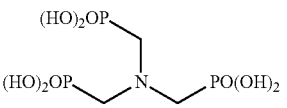 Mw: 299 | |
| Ethylene diamine tetra(methylenephosphonic acid) (EDTMP) | 1970s | 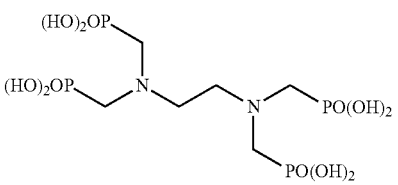 Mw: 436 | |

TABLE 1-continued

Commercially available amino methylene phosphonates

| Name (Abbreviation) | Applicating age | Structure and Molecular weight |
|---|---|---|
| Diethylenetriamine penta(methylenephosphonic acid) (DTPMP) | 1970s | 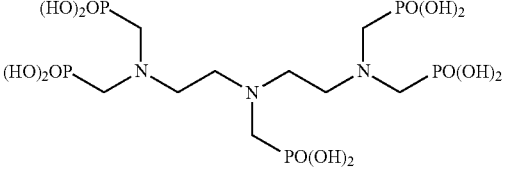<br>Mw: 573 |
| Hexamethylene diamine tetra(methylenephosphonic acid) (HDTMP) | 1980s | 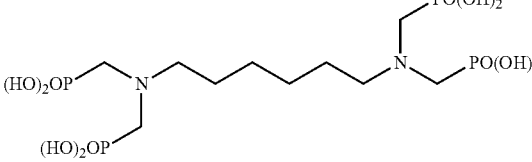<br>Mw: 492 |
| Polyamino polyether tetra(methylene phosphonate) (PAPEMP) | 1990s | 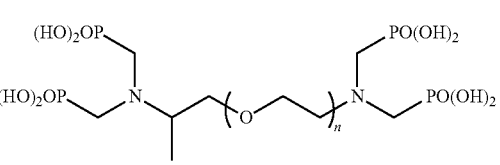<br>n: 2~3 Mw: 600 |

There are two series in the conventional scale antiscalants, phosphonates and carboxylate polymers. For having good efficiency of corrosion and scale inhibition, phosphonates has been widely applied. Besides 1-Hydroxyethylidene-1,1-diphosphonic (HEDP) and 2-phosphonobutane-1,2,4-tricarboxylic acid (PBTCA), the phosphonates currently available on the market mainly belongs to amino methylene phosphonic acid, which is shown in table 1.

Except that the PAPEMP is oligomer, the phosphonates based methylene phosphonic acid all belong to micromolecular compounds. Due to low price and good inhibition scale efficiency thereof, they are widely applied to industrial water treatment, and occupy a great market share therein. However, almost all of the micromolecular phosphonates has no satisfying calcium tolerance.

Compared with other micromolecular phosphonates based methylene phosphonic acid such as ATMP, EDTMP, DTPMP and HTDMP, PAPEMP belongs to polymer and has a higher molecular weight. U.S. Pat. Nos. 5,535,157 and 5,358,642 disclose that PAPEMP has high calcium tolerance and is suitable for harsh conditions of high hardness water. However, PAPEMP has far less inhibition scale efficiency than micromolecular phosphonates under conditions of low calcium concentration, and requires a higher concentration of antiscalants for the same inhibition scale effect. Meanwhile, PAPEMP has bad inhibition scale efficiency to barium sulfate and is not suitable for scale inhibition treatment on oilfield flooding and reverse osmosis water.

Compared with linear polymers, dendrimer, which is a new type polymer in recent years, has structural characteristics of accurate molecular structure, high geometric symmetry, a great quantity of functional groups in periphery, cavity existed in the molecule, controllability of molecular weight and nanometer-sized molecule and etc. Therefore, the dendrimer draws universal concern of more and more scientists from all over the world and has important application prospects in many areas such as industry, agriculture, national defense, biomedicine, delivery material and catalysis.

The pentaerythritol core, phosphonic acid terminated dendrimers prepared by the present invention are new structure, and not disclosed both in China and other countries. Experimental results show that the new type dendrimer has high calcium tolerance, and excellent inhibiting scale performances for calcium carbonate, calcium sulfate and barium sulfate.

SUMMARY OF THE PRESENT INVENTION

An object of the present invention is to provide a high calcium tolerance, pentaerythritol core, phosphonic acid terminated dendrimer and its preparation method.

Accordingly, in order to accomplish the object mentioned above, the present invention provides a new type dendrimer, i.e., a pentaerythritol core, phosphonic acid terminated dendrimer, which has the following structure formula of:

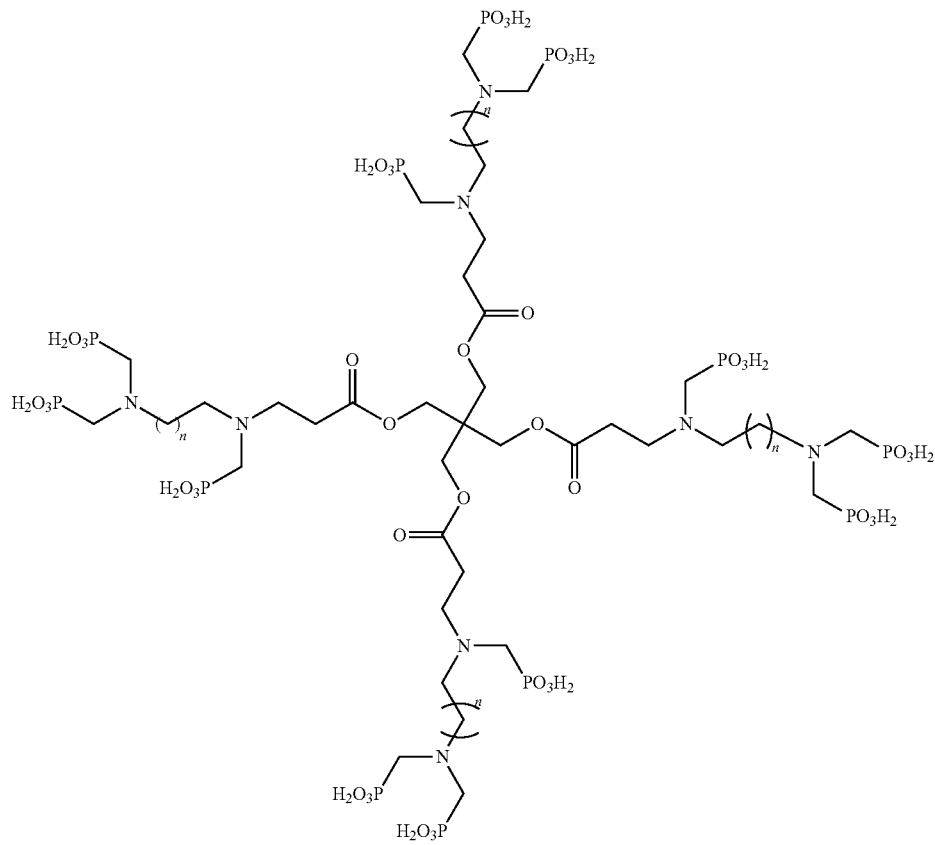

wherein n is an integer from 1 to 5.

The present invention provides a method for preparing pentaerythritol core, phosphonic acid terminated dendrimer, which comprises concrete steps as follows.

(1) Synthesis of Pentaerythritol Core, Amino Terminated Dendrimer

The alkylidenediamine (ADA for abbreviation) is added into a round-bottom flask equipped with a stirring, a reflux condenser and a thermometer, and cooled to 10° C. below under nitrogen. The methanol solution of pentaerythritol tetraacrylate (PETA for abbreviation) is then added to the flask, and the mixture is allowed to react at 25~35° C. for 20~48 hours, preferably, at 25~30° C. for 24~30 hours. The result solution is subjected to vacuum distillation to remove excess alkylidenediamine (ADA) and methanol at 60~110° C. for 5~10 hours, to obtain a light-amber viscous material, i.e., intermediate pentaerythritol core, amino terminated dendrimer (PETA-ADA-12NH for abbreviation), wherein a general reaction equation thereof is as follows:

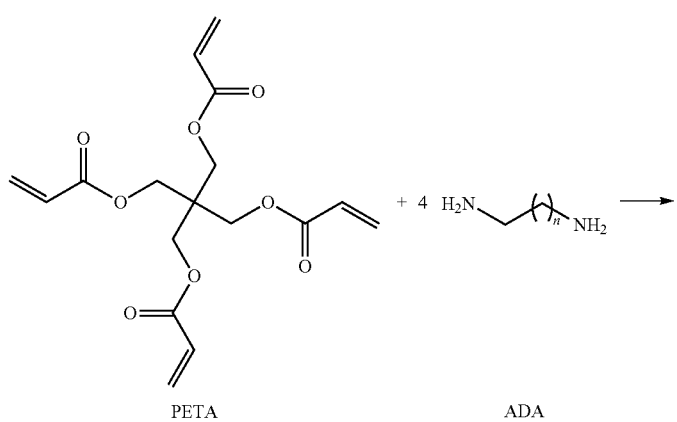

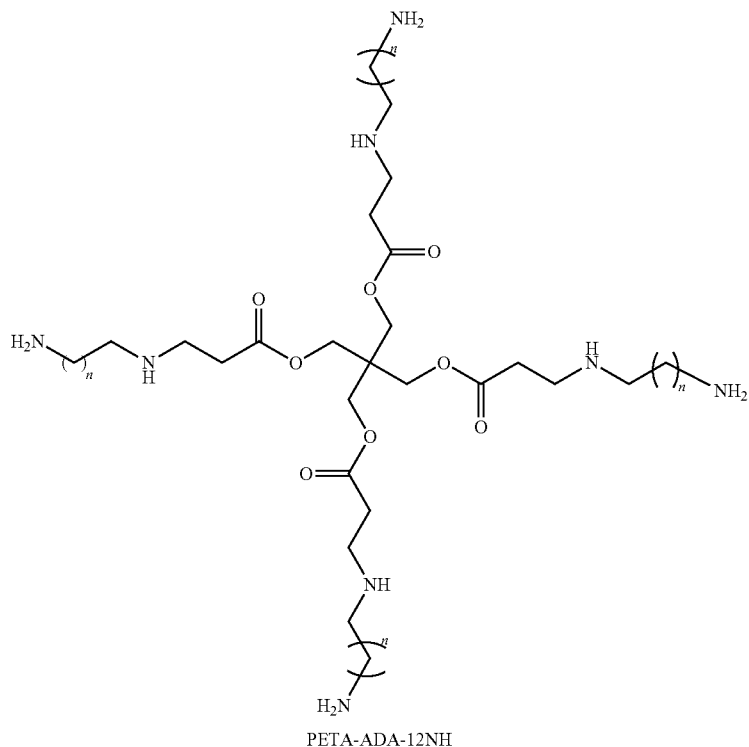

PETA-ADA-12NH wherein n is an integer from 1 to 5.

(2) Synthesis of Pentaerythritol Core, Phosphonic Acid Terminated Dendrimer

Phosphorous acid and concentrated hydrochloric acid are respectively placed in a four-necked flask equipped with a condenser, a stirring, a thermometer and a dropping funnel. Next, aqueous solution of the intermediate pentaerythritol core, amino terminated dendrimer (PETA-ADA-12NH for abbreviation) is slowly added to above mixture solution with cooling and stirring in such a rate to maintain temperature below 40° C. The resulting mixture is heated up to 85~90° C., and formaldehyde solution is then added to the mixture with stirring to form a reaction mixture, the temperature of the reaction mixture maintains at 90° C. for 1~2 hour, and then is elevated to 102~105° C. for a reflux period of 2~4 hours, after the reflux, reaction mixture is concentrated at 102~105° C., and meanwhile, hydrochloric acid is removed off with HCl absorption bottle. Next, the reaction mixture is cooled to ambient temperature, to give an amber transparent liquid product with 30~40% solid content by weight, i.e., the pentaerythritol core, phosphonic acid terminated dendrimer (PETA-ADA-12PO$_3$H$_2$), wherein a general reaction equation thereof is as follows:

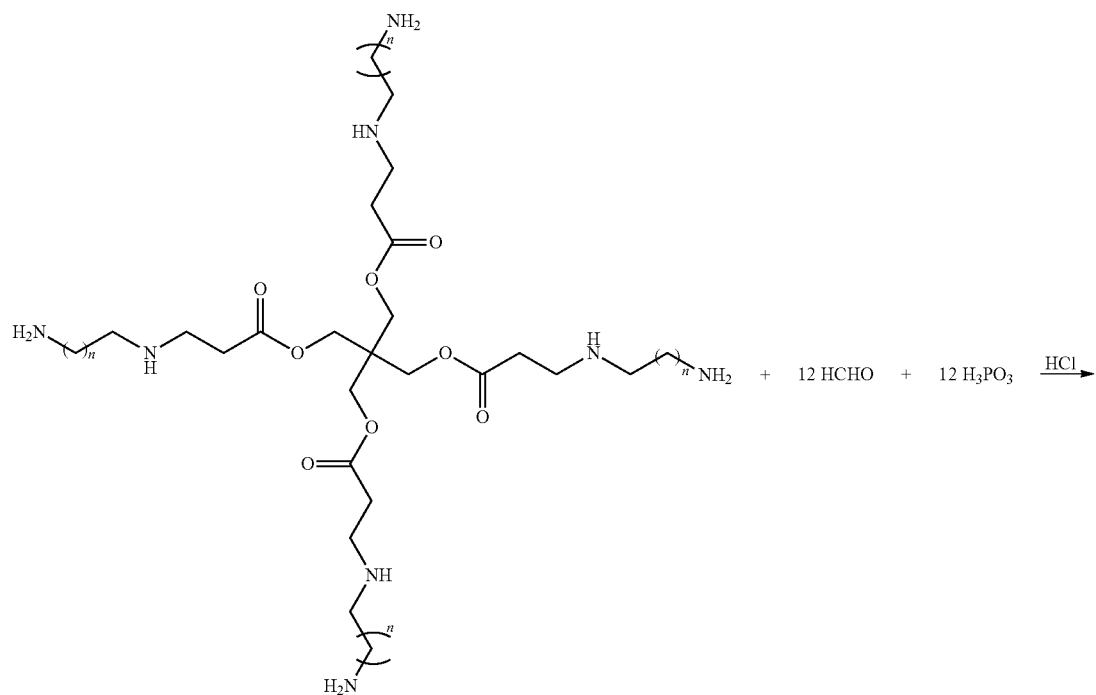
PETA-ADA-12NH
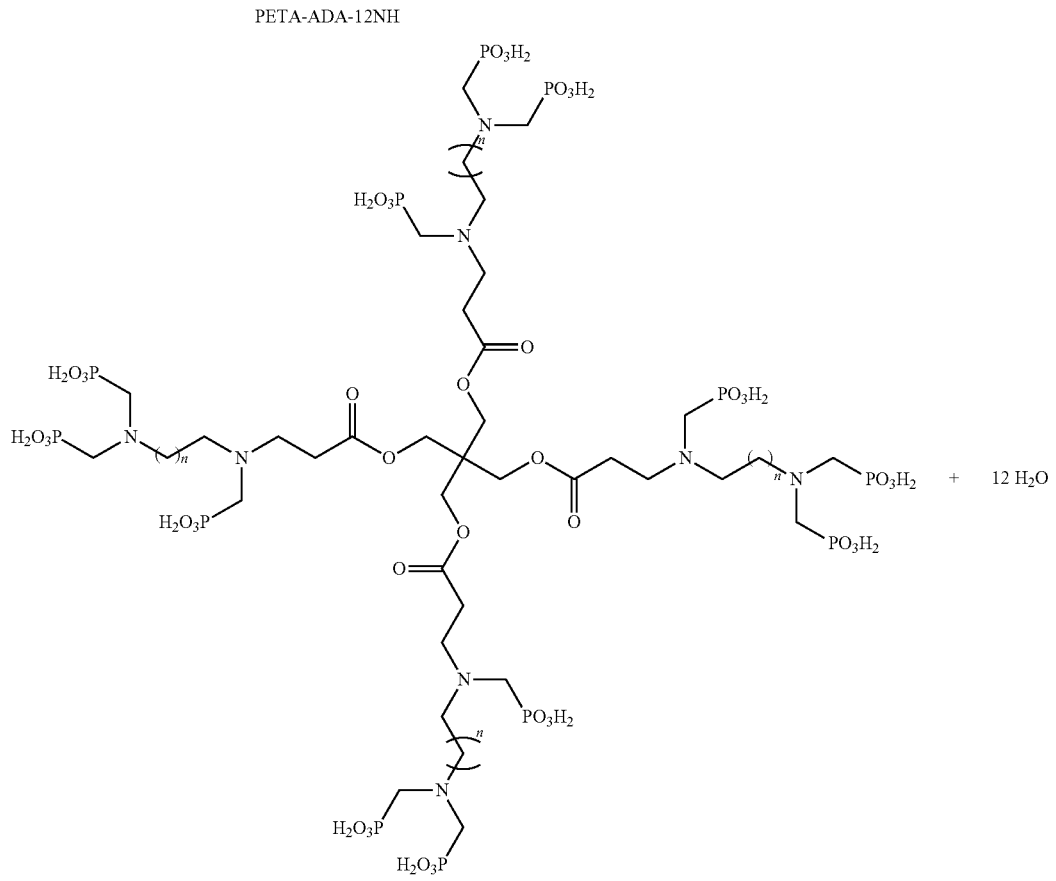
PETA-ADA-12PO$_3$H$_2$
wherein n is an integer from 1 to 5.

In the Michael reaction of the step (1) of the present invention, a molar ratio of the pentaerythritol tetraacrylate to the alkylidenediamine is 1:5~8.

In the methylene phosphonated reaction of the step (2) of the present invention, a molar ratio of the intermediate pentaerythritol core, amino terminated dendrimer, the phosphorous acid, the formaldehyde and the hydrochloric acid is 1:12.0~12.2:15.0~16.0:15.0~16.0.

In the present invention, the pentaerythritol tetraacrylate is provided commercially.

In the present invention, the alkylidenediamine is provided commercially, which has a chemical formula of $NH_2CH_2(CH_2)_nNH_2$, wherein n is an integer from 1 to 5.

In the present invention, the phosphorous acid ($H_3PO_3$) is provided commercially about 99.0% pure.

In the present invention, the formaldehyde (HCHO) is provided commercially about 37% by weight.

In the present invention, the concentrated hydrochloric acid is provided commercially about 37% by weight.

The pentaerythritol core, phosphonic acid terminated dendritic polymer prepared according to the present invention is a dendrimer having a terminal group of methylene phosphonic acid. Studies show that the pentaerythritol core, phosphonic acid terminated dendritic polymer provided in the present invention has a good inhibition scale efficiency under the condition of high concentration calcium due to a special dendrimer structure thereof.

The pentaerythritol core, phosphonic acid terminated dendritic polymer provided in the present invention is able to effectively inhibit formation of scales, such as calcium carbonate, calcium sulfate and barium sulfate. The pentaerythritol core, phosphonic acid terminated dendritic polymer has a good calcium tolerance, and can be widely used in circulating cooling water system having a high concentration multiple, boiler water, oil field water, sea water desalination, etc.

These and other objectives, features, and advantages of the present invention will become apparent from the following detailed description, the accompanying drawings, and the appended claims.

DETAILED DESCRIPTION OF THE PREFERRED EMBODIMENT

The methylene phosphonic acid antiscalants in the following comparison examples 1~4 are all commercially available.

Comparison example 1: micromolecular phosphonate antiscalant amino tri(methylene phosphonic acid) (ATMP)

Comparison example 2: micromolecular phosphonate antiscalant ethylene diamine tetra(methylene phosphonic acid) (EDTMP)

Comparison example 3: micromolecular phosphonate antiscalant hexane diamine tetra(methylene phosphonic acid) (HDTMP)

Comparison example 4: macromolecular oligomer phosphonate antiscalant polyamino polyether tetra(methylene phosphonic acid) (PAPEMP)

EXAMPLE 1

Preparation Method of Pentaerythritol Core, Phosphonic Acid Terminated Dendrimer 48.00 g of ethylenediamine (EDA) (0.80 mol) was added into a round-bottom flask with a stirring, a reflux condenser and a thermometer, and cooled to 10° C. below under nitrogen. 88.00 g of methanol solution of pentaerythritol tetraacrylate (PETA) (40%, 0.1 mol) was added to the round-bottom flask, and the mixture is allowed to react at 25° C. for 24 hours. The result solution is subjected to vacuum distillation to remove excess ethylenediamine (EDA) and methanol at 80° C. for 5 hours, to yield 59.19 g of light-amber viscous material, i.e., intermediate pentaerythritol core, amino terminated dendrimer (PETA-EDA-12NH for abbreviation).

24.85 g of phosphorous acid (99.0%, 0.300 mol) and 37.98 g of concentrated hydrochloric acid (37%, 0.385 mol) were respectively placed and uniformly mixed in a four-necked flask equipped with a condenser, a stirring, a thermometer and a dropping funnel. Next, 29.60 g (50%, 0.025 mol) aqueous solution of the intermediate pentaerythritol core, amino terminated dendrimer (PETA-ADA-12NH for abbreviation) was slowly added to above mixture solution with cooling and stirring in such a rate to maintain temperature below 40° C. The resulting mixture was heated up to 85° C., and 30.40 g of formaldehyde solution (37%, 0.375 mol) was then added to the mixture with stirring to form a reaction mixture. The temperature of the reaction mixture maintained at 90° C. for 1 hour, and then was elevated to 102° C. for a reflux period of 4 hours. After the reflux, reaction mixture was concentrated at 103° C. for 1 hour, and meanwhile, hydrochloric acid was removed off with HCl absorption bottle. Next, the reaction mixture was cooled to ambient temperature, to give an amber transparent liquid product with 39.2% solid content by weight, i.e., the pentaerythritol core, phosphonic acid terminated dendrimer (PETA-ADA-12PO$_3$H$_2$).

$^{13}$C NMR (D$_2$O) of PETA-EDA-12NH: δ 35.63; 38.69; 41.75; 44.59; 50.27; 61.19; 175.05 ppm $^{13}$C NMR (D$_2$O) of PETA-EDA-12PO$_3$H$_2$: δ 33.40; 38.67; 50.56; 51.59; 53.17; 54.63; 56.52; 64.83; 174.10 ppm

EXAMPLE 2

Preparation Method of Pentaerythritol Core, Phosphonic Acid Terminated Dendrimer 70.40 g of 1,4-Butanediamine (BDA) (0.80 mol) was added into a round-bottom flask with a stirring, a reflux condenser and a thermometer, and cooled to 10° C. below under nitrogen. 88.00 g of methanol solution of pentaerythritol tetraacrylate (PETA) (40%, 0.1 mol) was added to the round-bottom flask, and the mixture is allowed to react at 25° C. for 24 hours. The result solution is subjected to vacuum distillation to remove excess 1,4-Butanediamine (BDA) and methanol at 90° C. for 5 hours, to yield 70.41 g of light-amber viscous material, i.e., intermediate pentaerythritol core, amino terminated dendrimer (PETA-BDA-12NH for abbreviation).

40.10 g of phosphorous acid (99.0%, 0.484 mol) and 63.15 g of concentrated hydrochloric acid (37%, 0.64 mol) were respectively placed and uniformly mixed in a four-necked flask equipped with a condenser, a stirring, a thermometer and a dropping funnel. Next, 56.32 g (50%, 0.040 mol) aqueous solution of the intermediate pentaerythritol core, amino terminated dendrimer (PETA-BDA-12NH) was slowly added to above mixture solution with cooling and stirring in such a rate to maintain temperature below 40° C. The resulting mixture was heated up to 90° C., and 50.27 g of formaldehyde solution (37%, 0.62 mol) was then added to the mixture with stirring to form a reaction mixture. The temperature of the reaction mixture maintained at 90° C. for 1 hour, and then was elevated to 105° C. for a reflux period of 4 hours. After the reflux, reaction mixture was concentrated at 105° C. for 1 hour, and meanwhile, hydrochloric acid was removed off with HCl absorption bottle. Next, the reaction mixture was cooled to ambient temperature, to give an amber transparent liquid product with 38.87% solid content by weight, i.e., the pentaerythritol core, phosphoryl group terminated dendrimer (PETA-BDA-12PO$_3$H$_2$).

$^{13}$C NMR (D$_2$O) of PETA-EDA-12NH: δ26.74; 29.52; 35.12; 38.29; 44.48; 50.29; 50.93; 61.76; 174.91 ppm $^{13}$C NMR (D$_2$O) of PETA-EDA-12PO$_3$H$_2$: δ24.78; 25.15; 33.69; 38.98; 53.45; 56.77; 56.99; 58.37; 58.81; 65.43; 173.45 ppm

EXAMPLE 3

Preparation Method of Pentaerythritol Core, Phosphonic Acid Terminated Dendrimer 81.20 g of 1,6-Hexanediamine Ethylenediamine (HDA) (0.7 mol) was added into a round-bottom flask with a stirring, a reflux condenser and a thermometer, and cooled to 10° C. below under nitrogen. 88.00 g of methanol solution of pentaerythritol tetraacrylate (PETA) (40%, 0.1 mol) was added to the round-bottom flask, and the mixture is allowed to react at 25° C. for 24 hours. The result solution is subjected to vacuum distillation to remove excess 1,6-Hexanediamine Ethylenediamine (HDA) (0.7 mol) and methanol at 110° C. for 8 hours, to yield 81.58 g of light-amber viscous material, i.e., intermediate pentaerythritol core, amino terminated dendrimer (PETA-HDA-12NH for abbreviation).

24.85 g of phosphorous acid (99.0%, 0.300 mol) and 37.98 g of concentrated hydrochloric acid (37%, 0.385 mol) were respectively placed and uniformly mixed in a four-necked flask equipped with a condenser, a stirring, a thermometer and a dropping funnel. Next, 40.80 g (50%, 0.025 mol) aqueous solution of the intermediate pentaerythritol core, amino terminated dendrimer (PETA-HDA-12NH) was slowly added to above mixture solution with cooling and stirring in such a rate to maintain temperature below 40° C. The resulting mixture was heat up to 85° C., and 30.40 g of formaldehyde solution (37%, 0.375 mol) was then added to the mixture with stirring to form a reaction mixture. The temperature of the reaction mixture maintained at 90° C. for 1 hour, and then was elevated to 103° C. for a reflux period of 4 hours. After the reflux, reaction mixture was concentrated at 103° C. for 1 hour, and meanwhile, hydrochloric acid was removed off with HCl absorption bottle. Next, the reaction mixture was cooled to ambient temperature, to give an amber transparent liquid product with 39.12% solid content by weight, i.e., the pentaerythritol core, phosphonic acid terminated dendrimer (PETA-HDA-12PO$_3$H$_2$).

$^{13}$C NMR (D$_2$O) of PETA-EDA-12NH: δ 26.12; 26.95; 31.62; 32.32; 37.02; 38.79; 44.67; 49.21; 49.92; 61.82; 173.1 ppm $^{13}$C NMR (D$_2$O) of PETA-EDA-12PO$_3$H$_2$: δ 25.32; 25.61; 27.13; 27.56; 34.56; 39.14; 53.19; 54.45; 55.23; 58.96; 59.47; 66.04; 173.1 ppm

EXAMPLE 4

Inhibition Scale Efficiency Test

The static testes for the inhibition efficiency of the antiscalants according to the examples 1~3 on calcium carbonate, calcium sulfate and barium sulfate scale precipitation were performed as following methods.

Static inhibition efficiency test for calcium carbonate was performed by referring to national standard of the People's Republic of China, calcium carbonate deposition method for testing scale inhibiting efficiency of water treatment agent (GB/T 16632-2008). 500 mL of test solution containing 10 mg·L$^{-1}$ of antiscalant (dry basis), 240 mg·L$^{-1}$ of Ca$^{2+}$ and 732 mg·L$^{-1}$ of HCO$_3^-$ was prepared by adding calculated volume antiscalant stock solution, calcium stock solution, bicarbonate stock solution and double distilled water, respectively, to a glass bottle. The pH of each test solution was adjusted to 9.0 by using borate buffer Solution. The bottles were incubated in a water bath for 18 hour at 80° C. After cooling, an aliquot quantity was filtered through 0.22 μm filter paper, and then the calcium concentration in the filtrate was measured using the standard EDTA titration method. Meanwhile, the control test in the absence of antiscalant was conducted.

Static inhibition efficiency test for calcium sulfate was performed similar to the static calcium carbonate inhibition efficiency. The 500 mL of test solution contained 5 mg·L$^{-1}$ of antiscalant (dry basis), 2500 mg·L$^{-1}$ of Ca$^{2+}$ and 7350 mg·L$^{-1}$ of SO$_4^{2-}$. It was adjusted to 7.00±0.1 by the addition of HCl and/or NaOH solution (10%). The bottles were incubated in a water bath for 18 hour at 80° C. After cooling, an aliquot quantity was filtered through 0.22 μm filter paper, and then the calcium concentration in the filtrate was measured by using the standard EDTA titration method. Meanwhile, the control test in the absence of antiscalant was conducted.

Static inhibition efficiency test for barium sulfate was performed as follows. 500 mL of test solution containing 5 mg·L$^{-1}$ of antiscalant (dry basis), 20 mg·L$^{-1}$ of Ba$^{2+}$ and 100 mg·L$^{-1}$ of SO$_4^{2-}$ was prepared by adding calculated volume antiscalant stock solution, barium stock solution, sulfate stock solution and double distilled water, respectively, to a glass bottle. The pH of each test solution was adjusted to 7.0 by using borate buffer Solution. The bottles were incubated in a water bath for 16 hours at 65° C. After cooling, an aliquot quantity was filtered through 0.22 μm filter paper, and then the Ba$^{2+}$ concentration in the filtrate was measured by using the atomic emission spectrometry method. Meanwhile, the control test in the absence of antiscalant was conducted.

The inhibition scale efficiency of the antiscalant is calculated by:

$$\text{Inhibition (\%)} = [(C_i - C_{control})/(C_0 - C_{control})] \times 100\%$$

Where: $C_i$ is the calcium or barium concentration of the sample with the addition of the polymeric inhibitor after incubation, $C_{control}$ is the calcium or barium concentration of the sample with the addition of the antiscalant before incubation, $C_0$ is the calcium or barium concentration of the sample without of the addition of the antiscalant after incubation.

Table 3 summarizes static inhibition scale efficiency tests for the pentaerythritol core, phosphonic acid terminated dendrimer as well as several prior art antiscalants. The inhibition efficiency on CaCO$_3$, CaSO$_4$ and BaSO$_4$ of the pentaerythritol core, phosphonic acid terminated dendrimer is far better than micromolecular phosphonate antiscalants ATMP, EDTMP and HTDMP in comparison examples 1~3. The inhibition efficiency on CaCO$_3$, CaSO$_4$ thereof is slightly better than macromolecule oligomer phosphonate PAPEMP in comparison example 4, but the inhibition efficiency on BaSO$_4$ is far better than PAPEMP.

TABLE 3

Result of inhibition scale efficiency test

| Ex. No. | Antiscalants | Inhibition efficiency for CaCO$_3$ (%) | Inhibition efficiency for CaSO$_4$ (%) | Inhibition efficiency for BaSO$_4$ (%) |
| --- | --- | --- | --- | --- |
| Example 1 | PETA-EDA-12PO$_3$H$_2$ | 83.76 | 93.98 | 97.25 |
| Example 2 | PETA-BDA-12PO$_3$H$_2$ | 81.35 | 95.22 | 96.64 |
| Example 3 | PETA-HDA-12PO$_3$H$_2$ | 80.22 | 96.65 | 95.29 |
| Comparison example 1 | ATMP | 54.21 | 72.19 | 80.23 |
| Comparison example 2 | EDTMP | 57.81 | 77.23 | 87.79 |
| Comparison example 3 | HTDMP | 65.77 | 81.14 | 84.23 |
| Comparison example 4 | PAPEMP | 74.57 | 90.32 | 51.23 |

EXAMPLE 5

The Effect of the Antiscalant Concentration on the Inhibition Calcium Carbonate Scale Efficiency The 500 mL of test solution containing a certain concentration of antiscalant, 200 mg·L$^{-1}$ of $Ca^{2+}$ (500 mg·L$^{-1}$ as $CaCO_3$) and 732 mg·L$^{-1}$ of $HCO_3^-$ was prepared by adding calculated volume antiscalant stock solution, calcium stock solution, bicarbonate stock solution and double distilled water, respectively, to a glass bottle. The pH of each test solution is adjusted to 9.0 by using borate buffer Solution. The bottles were incubated in a water bath for 10 hour at 80° C. After cooling, an aliquot quantity was filtered through 0.22 μm filter paper, and then the calcium concentration in the filtrate was measured by using the standard EDTA titration method. Meanwhile, the control test in the absence of antiscalant was conducted.

TABLE 4

The effect of antiscalant concentrations on the inhibition $CaCO_3$ efficiency

| Ex. No. | Antiscalants | Inhibition efficiency for $CaCO_3$ (%) Antiscalant Concentration (mg·L$^{-1}$) | | | | | | | |
|---|---|---|---|---|---|---|---|---|---|
| | | 2 | 4 | 6 | 8 | 10 | 12 | 14 | 16 |
| Example 1 | PETA-EDA-12PO$_3$H$_2$ | 45.11 | 58.76 | 72.99 | 88.03 | 95.11 | 98.43 | 100 | 100 |
| Example 2 | PETA-BDA-12PO$_3$H$_2$ | 43.97 | 57.03 | 71.23 | 84.24 | 96.73 | 100 | 100 | 100 |
| Example 3 | PETA-HDA-12PO$_3$H$_2$ | 42.22 | 56.23 | 70.26 | 82.52 | 97.59 | 100 | 100 | 100 |
| Comparison example 1 | ATMP | 50.55 | 60.18 | 69.54 | 73.89 | 72.31 | 70.99 | 70.17 | 70.15 |
| Comparison example 2 | EDTMP | 48.11 | 56.32 | 66.84 | 73.83 | 80.58 | 79.45 | 78.23 | 77.22 |
| Comparison example 3 | HTDMP | 42.88 | 54.43 | 61.84 | 70.86 | 82.62 | 85.75 | 86.22 | 87.58 |
| Comparison example 4 | PAPEMP | 30.64 | 46.33 | 64.11 | 77.22 | 84.24 | 90.22 | 95.32 | 100 |

Table 4 summarizes the effect of the antiscalant concentration on the inhibition calcium carbonate scale efficiency. It is shown that micromolecular phosphonate antiscalants exhibit an obvious "threshold effect", meaning that after the dosage of phosphonate exceeds a certain value (12 mg·L$^{-1}$ for PBTCA, 8 mg·L$^{-1}$ for ATMP, 10 mg·L$^{-1}$ for EDTMP, and 14 mg·L$^{-1}$ for HTDMP) the inhibition efficiency is not enhanced, but will decrease by further phosphonate concentration increase. However, the inhibition efficiency of the pentaerythritol core, phosphonic acid terminated dendrimer prepared in the present invention improves with the increase of its concentration in the range of experimental concentrations. When its concentration exceeds 8 mg·L$^{-1}$, the inhibition scale efficiency thereof is better than all of the micromolecular phosphonate antiscalants in the comparison examples 1~3. The pentaerythritol core, phosphonic acid terminated dendrimer is able to inhibit the formation of calcium carbonate completely, and is better than the oligomer phosphonate PAPEMP in comparison example 4.

EXAMPLE 6

The Inhibition Scale Efficiency Under the Condition of High Calcium Concentration The 500 mL of test solution containing a certain concentration of antiscalant, 600 mg·L$^{-1}$ of $Ca^{2+}$ (1500 mg·L$^{-1}$ as $CaCO_3$) and 750 mg·L$^{-1}$ of $HCO_3^-$ was prepared by adding calculated volume antiscalant stock solution, calcium stock solution, bicarbonate stock solution and double distilled water, respectively, to a glass bottle. The pH of each test solution is adjusted to 9.0 by using borate buffer Solution. The bottles were incubated in a water bath for 10 hour at 80° C. After cooling, an aliquot quantity was filtered through 0.22 μm filter paper, and then the calcium concentration in the filtrate was measured by using the standard EDTA titration method. Meanwhile, the control test in the absence of antiscalant was conducted.

TABLE 5

The effect of antiscalant concentrations on the inhibition calcium carbonate efficiency under the high calcium concentration

| Ex. No. | Antiscalants | Inhibition efficiency for $CaCO_3$ (%) Antiscalant Concentration (mg·L$^{-1}$) | | | | |
|---|---|---|---|---|---|---|
| | | 5 | 10 | 20 | 30 | 40 |
| Example 1 | PETA-EDA-12PO$_3$H$_2$ | 55.18 | 79.22 | 85.48 | 89.37 | 91.37 |
| Example 2 | PETA-BDA-12P$_3$H$_2$ | 53.99 | 74.52 | 86.06 | 90.76 | 92.01 |
| Example 3 | PETA-HDA-12PO$_3$H$_2$ | 53.03 | 73.65 | 87.22 | 92.83 | 93.39 |
| Comparison example 1 | ATMP | 15.06 | 21.92 | 30.4 | 20.33 | 18.22 |
| Comparison example 2 | EDTMP | 17.21 | 30.89 | 40.99 | 31.99 | 24.38 |
| Comparison example 3 | HTDMP | 16.9 | 40.36 | 55.06 | 45.06 | 40.19 |
| Comparison example 4 | PAPEMP | 15.33 | 44.11 | 66.22 | 77.44 | 80.1 |

Table 5 summarizes the effect of the antiscalant concentration on the inhibition calcium carbonate scale efficiency under the condition of high calcium concentration.

It is shown that the pentaerythritol core, phosphonic acid terminated dendrimer in the present invention has an excellent scale inhibiting efficiency under the condition of high calcium concentration. With the increasing of the dosage of the antiscalants, micromolecular phosphonate antiscalants in comparison examples 1~3 combine easily with the higher concentration calcium ions to form Ca-phosphonate precipitates, which causes the sharp decreasing of the inhibiting scale efficiency. However, the pentaerythritol core, phosphonic acid terminated dendrimer in the present invention can still remain a high scale inhibiting rate, and is better than the oligomer phosphonate PAPEMP in comparison example 4.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A pentaerythritol core, phosphonic acid terminated dendrimer comprising a formula illustrated as follows:

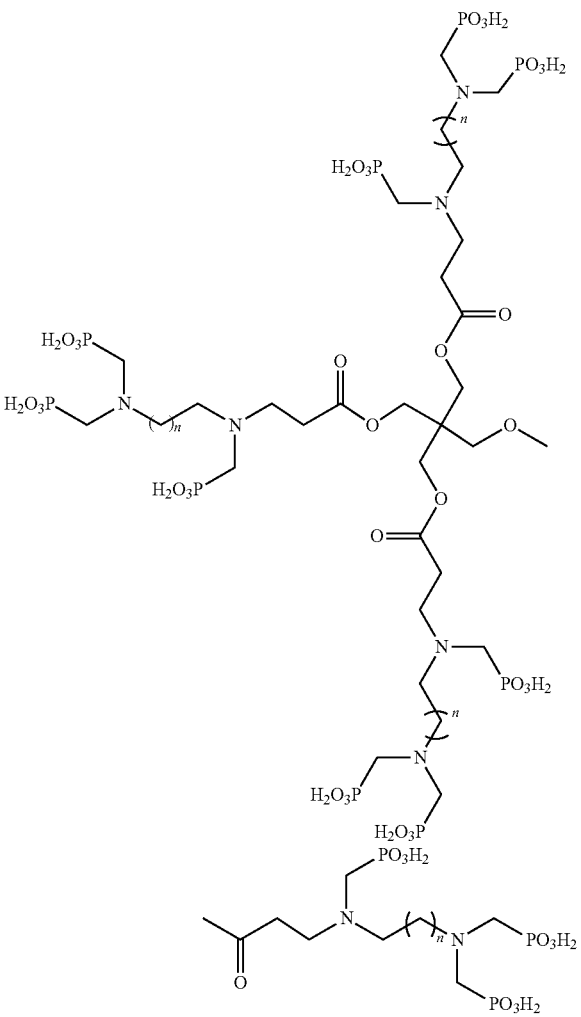

wherein n is an integer from 1 to 5.

* * * * *